(12) United States Patent
De Jesus et al.

(10) Patent No.: US 9,158,647 B2
(45) Date of Patent: Oct. 13, 2015

(54) FORMATTING SYSTEM MONITORING INFORMATION

(75) Inventors: Rey F. De Jesus, Arecibo, PR (US); Luis G. Chardon, Aguadilla, PR (US); Daniel Diaz, Aguadilla, PR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 357 days.

(21) Appl. No.: 13/809,690

(22) PCT Filed: Jul. 20, 2010

(86) PCT No.: PCT/US2010/042639
§ 371 (c)(1),
(2), (4) Date: Jan. 11, 2013

(87) PCT Pub. No.: WO2012/011896
PCT Pub. Date: Jan. 26, 2012

(65) Prior Publication Data
US 2013/0117661 A1 May 9, 2013

(51) Int. Cl.
*G06F 17/00* (2006.01)
*G06F 11/30* (2006.01)
*G06F 17/22* (2006.01)

(52) U.S. Cl.
CPC ........ *G06F 11/3086* (2013.01); *G06F 17/2247* (2013.01)

(58) Field of Classification Search
CPC .......... G06F 17/2247; G06F 2201/865; G06F 11/3086; G06F 11/3093
See application file for complete search history.

(56) References Cited

U.S. PATENT DOCUMENTS

| | | | |
|---|---|---|---|
| 7,225,343 B1 * | 5/2007 | Honig et al. ................. | 713/194 |
| 7,840,395 B2 * | 11/2010 | Nasle et al. .................... | 703/18 |
| 7,844,766 B1 * | 11/2010 | Straitiff .......................... | 710/72 |
| 8,055,555 B2 * | 11/2011 | Todd et al. .................... | 705/29 |
| 8,155,908 B2 * | 4/2012 | Nasle et al. .................... | 702/85 |
| 2002/0002580 A1 | 1/2002 | Nurick | |
| 2002/0073236 A1 * | 6/2002 | Helgeson et al. ............ | 709/246 |
| 2004/0054690 A1 * | 3/2004 | Hillerbrand et al. ....... | 707/104.1 |
| 2006/0122469 A1 * | 6/2006 | Martel .......................... | 600/300 |
| 2006/0133582 A1 * | 6/2006 | McCulloch .................... | 379/45 |
| 2006/0224873 A1 | 10/2006 | McCormick et al. | |
| 2008/0004748 A1 * | 1/2008 | Butler et al. ................. | 700/244 |

(Continued)

FOREIGN PATENT DOCUMENTS

| | | |
|---|---|---|
| CN | 1302401 | 7/2001 |
| CN | 1682196 | 10/2005 |

(Continued)

OTHER PUBLICATIONS

Ajla Aksarnija et al, "Integration of Knowledge-based and Generative, . . . ", V. 24, pp. 3-16, Feb. 2010.

(Continued)

*Primary Examiner* — Laurie Ries
(74) *Attorney, Agent, or Firm* — Wall and Tong, LLP

(57) ABSTRACT

Embodiments disclosed herein relate to formatting system monitoring information. In one embodiment, a processor formats information related to monitoring a system. The formatted information may be related to components in a system. In one embodiment, the processor formats received information related to the system. The processor may output the formatted information.

12 Claims, 4 Drawing Sheets

(56) References Cited

U.S. PATENT DOCUMENTS

| | | |
|---|---|---|
| 2008/0120604 A1 | 5/2008 | Morris |
| 2009/0037783 A1 | 2/2009 | Vera et al. |
| 2009/0113323 A1 | 4/2009 | Zhao et al. |
| 2009/0216438 A1 | 8/2009 | Shafer |
| 2009/0307255 A1 | 12/2009 | Park |
| 2010/0021013 A1 | 1/2010 | Gale et al. |
| 2013/0117661 A1* | 5/2013 | De Jesus et al. ............ 715/234 |

FOREIGN PATENT DOCUMENTS

| | | |
|---|---|---|
| EP | 0284034 A2 | 9/1988 |
| KR | 10-2008-0005491 A | 1/2008 |

OTHER PUBLICATIONS

Chinese Office Action dated Aug. 24, 2015 issued for Appl. No. 201080069169.2; 9 pages.

* cited by examiner

FORMATTING SYSTEM MONITORING INFORMATION

BACKGROUND

Complex systems including interconnected components are prevalent. It may be desirable to monitor the activity of multiple components within a system, such as the activities occurring within a data center, manufacturing system, or transportation system. The monitoring may involve collecting data related to the various components.

BRIEF DESCRIPTION OF THE DRAWINGS

In the accompanying drawings, like numerals refer to like components or blocks. The following detailed description references the drawings, wherein.

DETAILED DESCRIPTION

Figure 1:
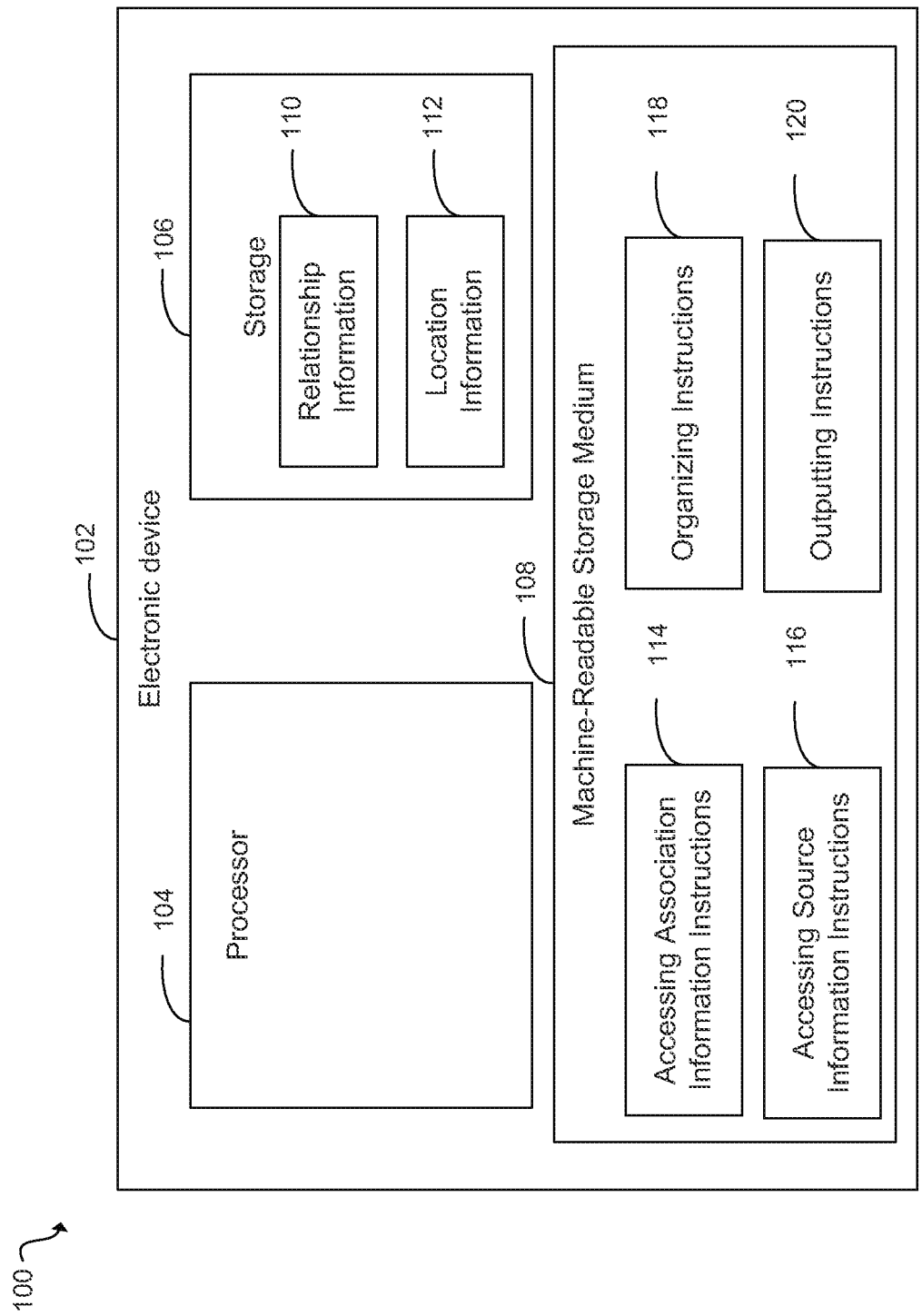
FIG. 1 is a block diagram illustrating one example of a computing system.

Monitoring a system that includes multiple interrelated components may be both time consuming and resource intensive. In some cases, monitoring information may be collected by a software program related to a particular component in the system. A software program or other measuring mechanism for each component may save the data related to the monitoring of a component in a separate location. For example, data related to the temperature of a data center may be stored in one database and data related to the power consumption of a server within the data center may be stored in another database. In order to more easily monitor the system, data related to the monitoring of each individual component may be stored in the same location. Updating where each monitoring method stores data, however, may involve a time consuming process. Some monitoring methods may allow for retrieving information related to components from multiple sources. In some cases, however, these methods may not provide for a simple way of collecting and organizing information about the various sources of information.

In one embodiment, the source of monitoring information related to each of multiple components in a system is organized in a simple and efficient manner. For example, information may be received from a user indicating the components in a system, the location of monitoring information related to each component, and the relationship between each of the components. In some cases, the information may be received via a user interface, such as a graphical user interface. The received information may be organized. For example, the information may be formatted in Extensible Markup Language (hereinafter "XML"). In some embodiments, the formatted information may then be used by multiple types of monitoring software. For example, information about each of the components may be retrieved from the variety of provided sources indicated in the formatted information. In some implementations, the measurements of the multiple components are then displayed comprehensively to a user, such as in a single user interface. For example, a user interface may display multiple traffic intersection components and information about the activity at each.

A user interface may allow a user to more easily input information related to relationships between components in a system and the source of monitoring information related to components in a system. The received information from a user interface may be automatically formatted, which may result in information being formatted more quickly and efficiently than a manual process of inputting and formatting data. Formatting information related to the source of measuring data may allow more types of monitoring software to be used without altering how measuring data is stored. In addition, capturing information related to relationships between components may allow a user to detect a dependency between components being monitored. The dependency information may be useful to determine the effect of one component's operation on another, such as the effect of a failure of one component on the rest of the system. Information from multiple sources may be retrieved based on the formatted information to determine the state of multiple components. Displaying information related to multiple components to a user simultaneously may allow a user to more efficiently monitor a system, and in some cases, may increase the likelihood that a problem may be visible to a user.

FIG. 1 is a block diagram illustrating one example of a computing system 100. The computing system 100 may include the electronic device 102. The electronic device 102 may be any suitable electronic device, such as a personal computer, server, or mobile phone. The electronic device 102 may include, for example, a processor 104, a storage 106, and a machine-readable storage medium 108.

The processor 104 may be any suitable processor, such as a central processing unit (CPU), a semiconductor-based microprocessor, or any other hardware device suitable for retrieval and execution of instructions stored in the machine-readable storage medium 108. In one embodiment, the electronic device 102 includes logic instead of or in addition to the processor 104.

The storage 106 may be any suitable storage device, such as a volatile or non-volatile memory. In one embodiment, the storage 106 is a database, such as a relational database or XML file. The storage 106 may include relationship information 110 and location information 112.

The relationship information 110 may be any suitable information related to associations between components in a system. The components may be any suitable collection of items. For example, in a data center the components may be servers, network equipment, computer room air conditioners (CRAC), power distribution unit (PDU), floor tiles, or environmental sensors. In a transportation system the components may be roads or intersections. The relationship information 110 may include information about a layout, floor plan, or position. The relationship information 110 may include information about dependencies between components, such as qualitative or quantitative information about how components depend on each other.

The location information 112 may be any suitable location information related to a location for information related to components in a system. The location information 112 may include, for example, a list of items and a source for monitoring information related to each of the items. The sources may be any suitable sources of information, such as a database, a web service, or a Simple Network Management Protocol (SNMP) network. The sources may contain any suitable information related to monitoring a component, such as information about use, temperature, pressure, or power consumption.

The machine-readable storage medium 108 may be any electronic, magnetic, optical, or other physical storage device that stores executable instructions or other data (e.g., a hard disk drive, random access memory, flash memory, etc.). In one embodiment, the machine-readable storage medium 108 and the storage 106 are combined into a single storage medium. The machine-readable storage medium 108 may include accessing association information instructions 114 for accessing the relationship information 110, accessing source information instructions 116 for accessing the location information 112, organizing instructions 118 for formatting the relationship information 110 and the location information 112, and outputting instructions 120 for outputting the formatted information.

Figure 2:
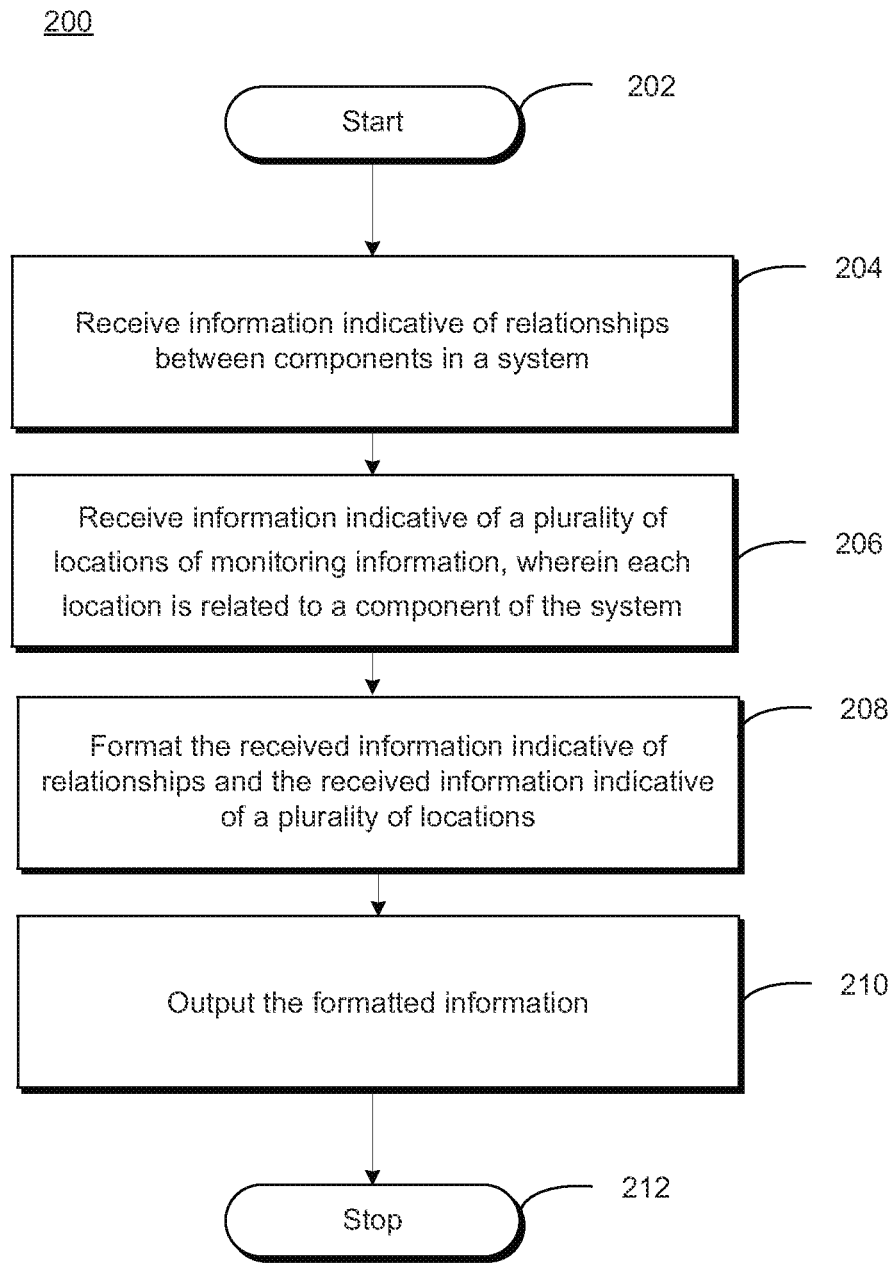
FIG. 2 is a flow chart illustrating one example of a method for formatting system monitoring information.

FIG. 2 is a flow chart illustrating one example of a method 200 for formatting system monitoring information. A system may include multiple components. In one embodiment, a system can be modeled by allowing a user to input information about components in a system, relationships between the components, and the source of monitoring information related to each of the components. The received information may then be formatted, for example, so that it may be used to monitor the system. The formatted information may be output, such as to a storage device, to a user interface displayed to a user, or to a system monitoring application.

Beginning at block 202 and moving to block 204, the processor 104, such as by executing the accessing association information instructions 114, receives information indicative of relationships between components in a system. The information may be any information indicating an association between items, such as the relationship information 110.

The relationship information 110 may be accessed in any suitable manner. For example, the processor 104 may retrieve the relationship information 110 from the storage 106 or from another data source. In one embodiment, the processor 104 receives the relationship information 110 from user input, such as from a user interface. For example, the processor 104 or another processor may display a user interface to a user for receiving the relationship information 110. In one embodiment, a graphical user interface receives user input that is then stored in the storage 106 where it is then retrieved by the processor 104. A graphical user interface may allow a user to design a system using custom design tools, such as shapes or stencils. For example, a user may design a floor plan and place components within it using design tools. In some cases, the user interface may allow a user to input information in addition to monitored components, such as information about walls in a network center or structures within a traffic system. In one embodiment, the design tools are integrated into an existing graphical editor. For example, design tools for monitoring a system may be imported into a graphical editor.

The received relationship information 110 may be any suitable relationship information. For example, the relationship information 110 may include information about how components are connected to each other, communicate with each other, or share resources with each other. The relationship information 110 may include information related to a floor plan, including the position, dimensions, and location of components in relation to each other or in relation to structural items, such as walls.

In one embodiment, the received relationship information 110 includes information about a dependency between components of a system. One component may depend on another such that it uses resources from another component to operate. For example, an electronic device component may be dependent on a power source component in order for the electronic device component to have power to operate. In some cases, two components may depend on one another such that they are interdependent.

The relationship information 110 may include dependency information related to a measure of the relevancy of a relationship, such as whether a relationship between two components is of high, medium, or low importance. The relevance of the relationship may be used for monitoring the effect of changes in a system. For example, a relationship of low relevance may indicate that if one of the components fads, the failure is not very relevant to another component related to it.

The dependency relationship information 110 may include a quantitative measure of the degree to which a component relies on another component. For example, a server with two power sources may rely 50% on each of the power sources. The dependency information may be relevant if a component that another component relies on appears to be having problems.

The relationship information 110 may include dependency information indicating how components use each other, such as the bandwidth of a network component used by a server component. The usage information may be helpful for showing the level of operation involved in supporting other components. The information may be helpful when monitoring a system to determine if a desired level of operation is available.

In one embodiment, the processor 104 processes the received relationship information 110. The processor 104 may adjust the received relationship information 110 in any suitable manner. For example, the processor 104 may calculate a dependency between components. In some implementations, a user may create a layout, such as a floor plan, and the processor 104 may determine the relative position and dimensions of components based on the layout.

Continuing to block 206, the processor 104, such as by executing the accessing source information instructions 116, receives information indicative of a plurality of locations of monitoring information, where each location is related to a component of the system. The information may be, for example, the location information 112. The location information 112 may indicate a location where monitoring information applicable to an item in a system may be retrieved.

The location information 112 may be accessed in any suitable manner. The processor 104 may retrieve the location information 112 from a storage, such as the storage 106. The processor 104 may receive the relationship information 110 from a user, such as from user input provided to a user interface. In one embodiment, user input is stored in the storage 106 where it is then retrieved by the processor 104.

In one embodiment, a processor, such as the processor 104 or a separate processor connected to a user computer, displays a user interface for receiving the location information 112. The user interface may in some cases be the same user interface for receiving the relationship information 110. The user interface may allow a user to create or select a component and enter information related to the source of monitoring information applicable to the component. In some cases, the components may be displayed to the user in a graphical format.

The location information 112 may include any suitable information related to the source of monitoring information related a component. The source may be, for example, a database, a file, a Simple Network Management Protocol application, or a web service. In some cases, the user may establish a data source connection, such as a connection to a database, and then associate the data source connection with a component, for example, using a graphical user interface. In one embodiment, the same source information is related to a group of components. The location information 112 may include more than one source for a particular component. In some cases, one source may be related to one aspect of monitoring a component and another source may be related to another aspect of monitoring the component. For example, a first source may have information related to the temperature of a component and a second source may have information related to the air pressure of a component.

In one embodiment, the processor 104 processes or updates the location information 112. For example, the processor 104 may test a data source. The location information 112 may include additional information about locating or processing the monitoring information from the indicated source. For example, the location information 112 may include information about combining fields within a database to determine certain characteristics related to a component. The processor 104 may aggregate or summarize source information.

Proceeding to block 208, the processor 104, such as by executing the organizing instructions 118, formats the received information indicative of relationships and the received information indicative of a plurality of locations. For example, the processor 104 may organize the relationship information 110 and the location information 112. The processor 104 may organize the relationship information 110 and the location information 112 in any suitable manner. For example, the processor 104 may create an XML or other file based on the relationship information 110 and the location information 112. The processor 104 may organize the relationship information 110 and the location information 112 and store it in a database. In one embodiment, the processor 104 formats the relationship information 110 separately from the location information 112, such as by creating two separate XML files. In one embodiment, the processor 104 formats additional information with the relationship information 110 and the location information 112.

Moving to block 208, the processor 104, such as by executing the outputting instructions 120, the processor 104 outputs the formatted information. For example, the processor 104 may store the formatted information, such as in the storage 106. The processor 104 may prepare the formatted information for display by another electronic device, or the processor 104 may display the formatted information.

In one embodiment, the formatted information is sent to a monitoring application or stored to be later be accessed by a monitoring method. The processor 104, or another processor for monitoring a system, may retrieve information related to a component from a source indicating by the formatted information. The processor 104 may obtain monitoring information about multiple components. For example, the processor 104 may retrieve information about the location of multiple products in a supply chain system. The processor 104 may store, transmit, or display the retrieved information. For example, the processor 104 may simultaneously display monitoring information related to multiple components to a user. In some cases, the processor 104 may create a report from the retrieved information. The method 200 then continues to block 210 and ends.

Figure 3:
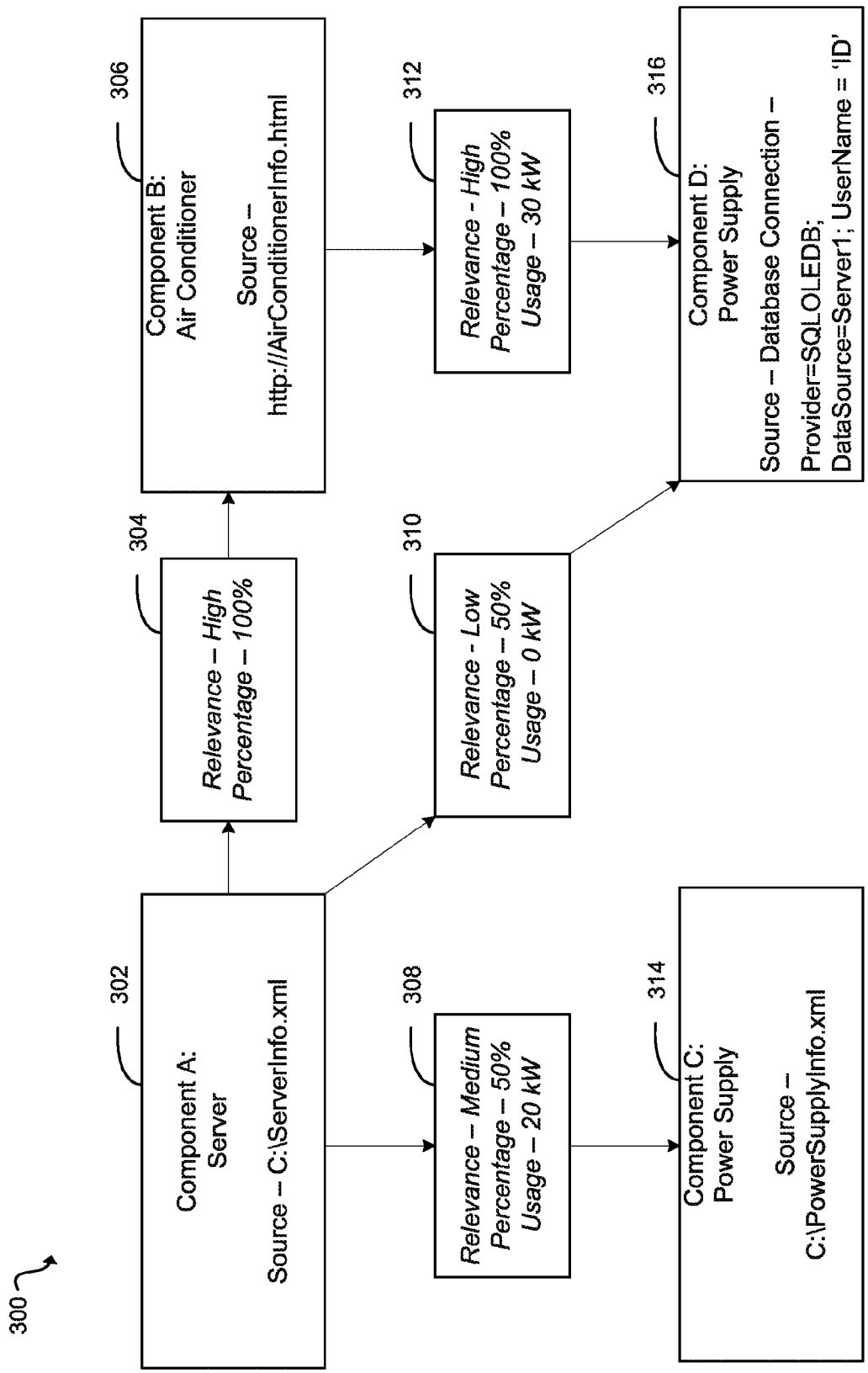
FIG. 3 is a block diagram illustrating one example of a user interface for receiving system monitoring information.

FIG. 3 is a block diagram illustrating one example of a user interface 300 for receiving system monitoring information. The user interface 300 is one example of a user interface for receiving the relationship information 110 and the location information 112. For example, the user interface 300 may include user input related to component A 302, component B 306, component C 314, and component D 316. In one embodiment, different types of components appear differently. The component A 302 is a server component with location information 112 for an XML file source of C:\ServerInfo.xml. The component B 306 is an air conditioner component with monitoring information associated with a web service located at http://AirConditionerInfo.html. The component C 314 is a power supply component. Location information 112 related to the component C 314 is an XML file found at C:\PowerSupplyInfo.xml. The component D 316 is another power supply component with monitoring information stored in a database with a connection string "Provider=SQLOLEDB; DataSource=Server1; UserName='ID'".

The user interface 300 may receive the relationship information 110. For example, the user interface 300 shows that the component A 302 is related to the component B 306, the component C 314, and the component D 316. The dependency information 314 shows that the component A 302 uses the component B 306 air conditioning to cool the server. Dependency information 314 illustrates that the component A 302 depends on the component B 306 with a high relevance and 100%. The 100% percentage shows that there is not a back up air conditioning system for the component A 302. The high relevance may indicate that a problem with the component B 306 would have a high impact on the component A 302.

The user interface 300 shows that the component A 302 server uses the component C 314 power supply and the component D 316 power supply for power. The dependency information 308 shows that the component C 314 has medium relevance to the component A 302 and that the component A 302 has a 50% percentage dependency on the component C 314. The usage information shows that the component A 302 uses 20 kW of power from the component C 314. The dependency information 310 shows that the component D 316 has a low relevance to the component A 302, that the component A 302 depends on the component D 316 by 50%, and that the component A 302 does not receive any power from the component D 316. The component A 302 may receive 20 kW of power from the component C 314, and the component D 316 may serves as a backup power source such that it is less relevant to the component A 302.

The user interface 300 shows that the component B 306 is related to the component D 316. For example, the component B air conditioner may receive power from the component D 316 power source. The dependency information 312 shows that the relationship is of high relevance, the component B 306 depends 100% on the component D 316, and the component B 306 receives 30 kW of power from the component D 316. The component B 306 may use the component D 316 for power without a backup power source, causing the relationship to be highly relevant.

Figure 4:
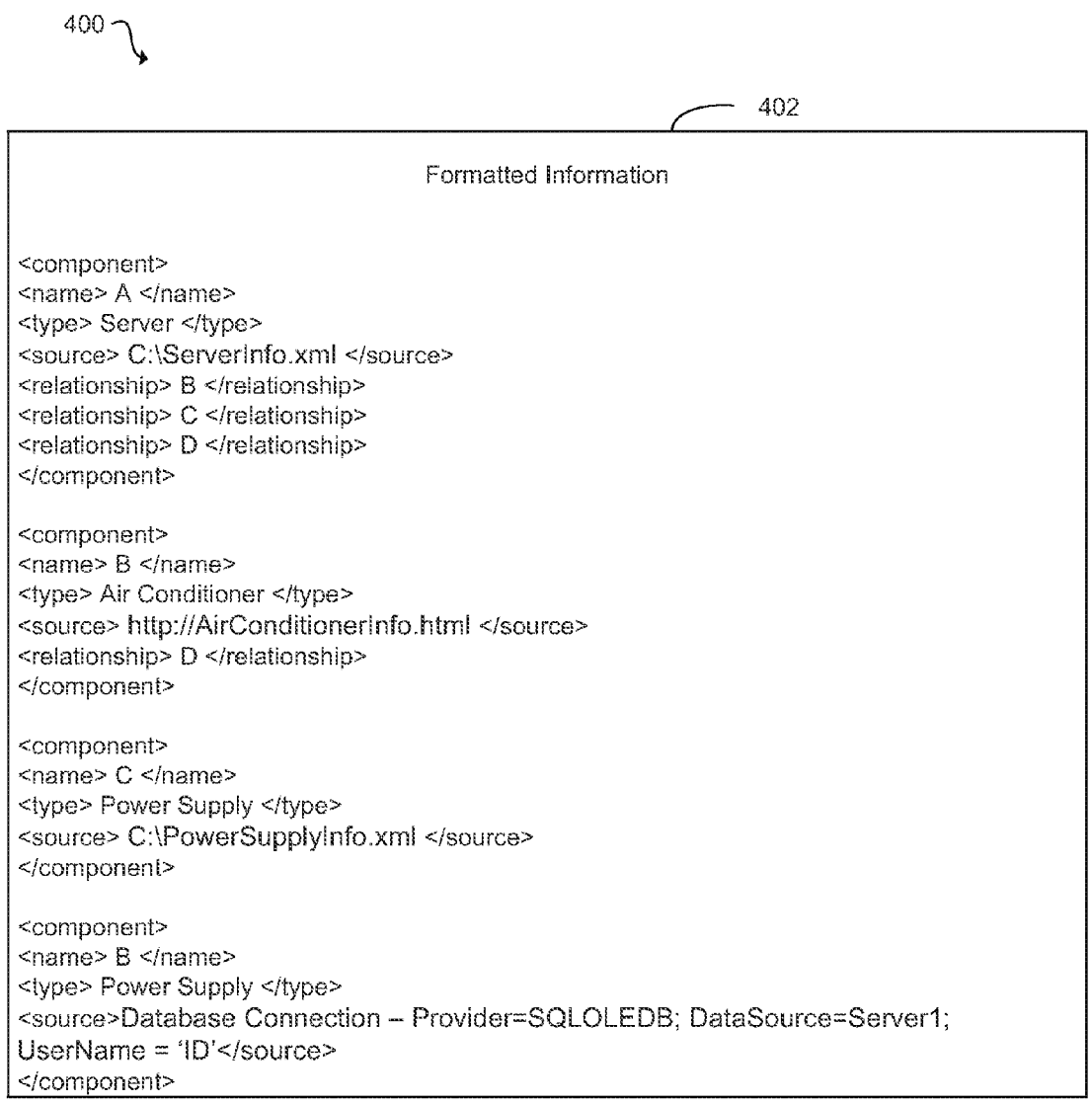
FIG. 4 is a block diagram illustrating one example of formatted system monitoring information.

FIG. 4 is a block diagram 400 illustrating one example of formatted system monitoring information 402. The formatted information 402 may be, for example, the relationship information 110 and the location information 112 collected from the user interface 300. The formatted information 402 is an XML file showing sample fields for formatting the relationship information 110 and the location information 112. The formatted information 402 shows a <component> tag for identifying components where each <component> tag may include a <name>, <type>, <source>, and <relationship> tag. The formatted information 402 includes a <component> tag for each of the four components shown in the user interface 300. The <name> tags give the names of the components, such as A, B, C, and D. The <type> tags give the type of component, such as whether the component is a server, air conditioner, or power source. The <source> tags show the source information associated with each of the components in the user interface 300. For example, the <source> tag for the component B 306 is the http://AirConditionerInfo.html shown in FIG. 3. The <relationship> tags indicate components that are depended on. For example, the component A 302 has three <relationship> tags, one for each of the components that it depends on. The formatted information 402 serves as an example, and information received in the user interface 300 may be formatted in other manners. The formatted information 402 may then be used to monitor the system.

Organizing relationship and location information related to multiple components in a system may allow components within a system to be more easily monitored. For example, monitoring information may be retrieved from various sources indicated in the formatted information. In addition, formatted relationship information may be used to indicate how retrieved monitoring information affects components in a system.

The invention claimed is:

1. A computing system for formatting system monitoring information, comprising:
   a storage configured to store:
      relationship information indicative of relationships between components in a system; and
      location information indicative of a plurality of locations of monitoring information, wherein each location is related to a component of the components in the system and the monitoring information for each one of the components is retrieved from a respective one of the each location of the plurality of locations; and
   a processor configured to:
      receive the relationship information and the location information;
      format the relationship information and the location information that are received;
      output the information that is formatted; and
      retrieve the monitoring information from the each location of the plurality of locations for each one of the components indicated by the location information in the information that is outputted.

2. The computing system of claim 1, wherein the processor is further configured to:
   receive the relationship information 110 and the location information 112 via a user interface; and
   store the relationship information and the location information that are received in the storage.

3. The computing system of claim 1, wherein the processor configured to format the relationship information and the location information comprises the processor configured to format the relationship information and the location information in Extensible Markup Language.

4. The computing system of claim 1, wherein the relationship information comprises information indicative of a dependency between the components of the system.

5. A method for formatting system monitoring information, comprising:
   receiving, by a processor, information indicative of relationships between components in a system;
   receiving, by the processor, information indicative of a plurality of locations of monitoring information, wherein each location is related to a component of the components of the system that is being monitored and the monitoring information for each one of the components is retrieved from a respective one of the each location of the plurality of locations;
   formatting, by the processors, the information indicative of relationships and the information indicative of a plurality of locations that are received;
   outputting, by the processor, the information that is formatted; and
   retrieving, by the processor, the monitoring information from the each location of the plurality of locations for each one of the components indicated by the location information in the information that is outputted.

6. The method of claim 5, wherein the information indicative of relationships and the information indicative of the plurality of locations are received via a user interface.

7. The method of claim 5, wherein the system comprises a data center.

8. The method of claim 5, wherein the formatting the information indicative of relationships and the information indicative of the plurality of locations that are received comprises formatting the information indicative of relationships and the information indicative of the plurality of locations that are received based on Extensible Markup Language.

9. A machine-readable storage medium encoded with instructions executable by processor for formatting system monitoring information, the machine-readable storage medium comprising instructions to:
   receive information related to associations between components in a system;
   receive information related to a plurality of sources of monitoring information, wherein each source of monitoring information indicates a source of information applicable to one of the components in the system that is being monitored and where to retrieve the monitoring information for each one of the components in the system;
   organize the information related to associations that is received and the information related to the plurality of sources that is received;
   output the information that is organized; and
   retrieve the monitoring information from the each source of the plurality of sources for each one of the components indicated by the location information in the information that is outputted.

10. The machine-readable storage medium of claim 9 further comprising instructions to display a user interface for receiving the information related to associations and the information related to the plurality of sources.

11. The machine-readable storage medium of claim 9, wherein organizing the information related to associations and the information related to the plurality of sources that are received comprises organizing the information that are received in Extensible Markup Language.

12. The machine-readable storage medium of claim 9, wherein the information related to associations between the components in the system comprises information indicative of a dependency between the components of the system.

* * * * *